United States Patent [19]

Kirk et al.

[11] Patent Number: 5,916,300
[45] Date of Patent: Jun. 29, 1999

[54] AUTOMATIC EVENT RECOGNITION TO TRIGGER RECORDING CHANGES

[75] Inventors: Geoffrey R. Kirk, San Francisco; Michael Timo Allison, Santa Clara; Paul Skoog, Santa Rosa, all of Calif.; Ian Timothy Viney, Christchurch, New Zealand

[73] Assignee: Trimble Navigation Limited, Sunnyvale, Calif.

[21] Appl. No.: 08/896,929

[22] Filed: Jul. 18, 1997

[51] Int. Cl.⁶ ..................................................... G06G 7/78
[52] U.S. Cl. ........................ 701/213; 73/178 R; 342/357
[58] Field of Search ..................... 701/213, 216, 701/35; 73/178 R; 342/357, 358, 457; 340/438, 439, 988; 360/48, 50, 51

[56] References Cited

U.S. PATENT DOCUMENTS

| | | | |
|---|---|---|---|
| 5,267,098 | 11/1993 | Lokhoff | 360/50 |
| 5,739,785 | 4/1998 | Allison et al. | 342/357 |
| 5,825,283 | 10/1998 | Camhi | 340/438 |
| 5,841,026 | 11/1998 | Kirk et al. | 73/178 R |

OTHER PUBLICATIONS

"Z–Surveyor,Integrated, dual frequency, compact GPS receiver for high–accuracy post–pocessed and real–time surveying", Ashtech, Apr. 1997.

"Ashtech Z–12 GPS Receiver, Full GPS Capablity with Anti–Spoofing Turned On", Astech, Apr. 1996.

"Z–12 GPS Sensor, 5H Position Updates, 100 ms Latency, & Centimeter Accuracy". Ashtech, Jun. 1996.

"Seismark, Seismic Surveying with Ashtech Real– time Z and Super C/A Technology", Ashtech, Jun. 1996.

*Primary Examiner*—Jacques H. Louis-Jacques
*Attorney, Agent, or Firm*—Blakely, Sokoloff, Taylor & Zafman LLP

[57] ABSTRACT

A method and apparatus for automatic event detection and processing is provided. A positioning system receiver includes a position measurement device and a logging device. The position measurement device is configured to receive and process signals from a positioning system. The logging device is coupled to the position measurement device for recording data received from the position measurement device. The logging device records the data at a current logging rate. The positioning system receiver detects an event via an external sensor or with reference to satellite data, for example. In response to the event, the logging device automatically modifies data logging processing such as the current logging rate. Additionally, to allow a post processing system to go backwards in time relative to the event, the current logging rate may be increased for a predetermined amount of time preceding the occurrence of the event. According to another aspect of the invention, the data logging processing of a survey system, such as a real-time kinematic (RTK) system including a base reference station and a roving unit, may be altered based upon an event. Positioning system data is received. A first subset of the positioning system data is recorded prior to the event being detected. The first subset of positioning system data may include real-time roving unit position solutions. If the event has been detected, a second subset of the positioning system data is recorded. The second subset of the positioning system data may include data used for post processing.

26 Claims, 8 Drawing Sheets

AUTOMATIC EVENT RECOGNITION TO TRIGGER RECORDING CHANGES

FIELD OF THE INVENTION

The invention relates generally to the field of survey systems based on positioning system information. More specifically, the invention relates to automatic event recognition to trigger data logging changes and post process data storage of positioning system information.

ART BACKGROUND

There are two broad classes of global positioning system (GPS) receivers: code-based and carrier phase based. Code-based receivers are less accurate than carrier phase receivers, but are useful for applications such as mapping. Code-based receivers calculate position based upon the time interval that it takes for signals to travel from at least four satellites to the receiver. More particularly, these receivers develop the pseudoranges to each visible satellite based on the time codes being sent without reference to the carrier phase. A particular rover position is not dependent upon prior positions of the rover; therefore, no memory of what has gone on before is required to calculate individual rover positions.

Carrier phase based receivers are extremely accurate global positioning system (GPS) receivers capable of centimeter-level accuracy. Carrier phase based receivers are typically employed in the fields of surveying and photogrammetry. Carrier phase based receivers calculate distances to visible satellites by determining the number of whole wavelengths and measuring the partial (phase) signal wavelength between the satellites and the receiver's antenna. It is important for carrier phase based receivers to continuously track the number of wavelengths that come across the antenna. Given the number of wavelengths, the pseudorange is calculated by multiplying the number of wavelengths by the wavelength of the carrier signal. Therefore, these receivers are adversely affected by cycle slips (i.e., discontinuities in the measured carrier beat phase resulting from temporary loss-of-lock in the carrier tracking loop). Further, when performing real-time kinematic (RTK) surveying, a radio link between the base reference station and the rover is critical to the computation of centimeter-level positions at the rover. In some cases, radio outages may cause the loss of RTK positioning. Therefore, it is desirable to detect events such as loss of radio and automatically revert to post process recording when real-time solutions are unavailable.

Turning now to post processed survey systems, generally, only a small subset of data collected during a typical survey is important. For example, in a typical photogrammetry application only the data collected within a predetermined window of time around the activation of the camera is important. Prior post processed survey systems typically perform data logging at the highest rate desired for the entire survey to assure the data of interest (e.g., the window of time around the activation of a camera) will be sampled at the appropriate rate. This prior method of data logging results in very large data files and unnecessarily long post processing times. It is desirable, therefore, to provide a method and apparatus for automatic event recognition to trigger recording changes in a post processed survey system to achieve different logging rates, for example.

SUMMARY OF THE INVENTION

A method and apparatus for automatic event detection and processing is disclosed. A positioning system receiver includes a position measurement device and a logging device. The position measurement device is configured to receive and process signals from a positioning system. The logging device is coupled to the position measurement device for recording data received from the position measurement device. The logging device records the data at a current logging rate. In response to the occurrence of a predetermined event, the logging device automatically modifies the current logging rate.

According to one aspect of the invention, the current logging rate is increased for a predetermined amount of time preceding and subsequent to the occurrence of the predetermined event. A temporary buffer may store data at a higher logging rate when the predetermined event occurs. The logging rate can retroactively be increased by storing the data that has been buffered at the higher rate. In one embodiment, this allows a post processing system to go backwards in time relative to the event. From a data management point of view, different logging rates provides an overall simplification of a survey system. For example, it allows the positioning system receiver to generate relatively small files for post processing. Therefore, the cost of the positioning system receiver is kept low because the amount of memory required is reduced. Further, post processing time is reduced because there is less data to download and process.

According to another aspect of the invention, the data logging processing of a survey system may be altered based upon a predetermined event. Positioning system data is received. A first subset of the positioning system data is recorded prior to the predetermined event being detected. However, if the predetermined event has been detected, a second subset of the positioning system data is recorded. In one embodiment, the surveying system is a real-time kinematic (RTK) system including a base reference station and a roving unit. Further, the first subset of the positioning system data may include real-time roving unit position solutions, and the second subset of the positioning system data may include data used for post processing.

Other features and advantages of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for automatic event detection and processing is described. Events may be detected with reference to satellite data or by sensors, external sensors, for example, and used to trigger data logging parameter modifications such as the type of data recorded or the frequency of recording. A particular point of interest on a survey path is preferably calculated by performing interpolation with one or more points recorded prior to the point of interest and one or more points recorded after the point of interest. It is desirable, therefore, to have the same rapid sampling rate immediately before and after the point of interest. In one embodiment, the system of the present invention includes a buffering mechanism that receives data at a high rate (e.g., a rate greater than or equal to the highest desired rate). The data is subsequently output to a logging device which records at the currently desired rate. Upon the occurrence of a predetermined event, a certain amount of data is buffered at the high rate. In this manner, data, sampled at the high rate, prior to the predetermined event is available for permanent storage.

While the invention will be described with reference to receivers compatible with the Global Positioning System (GPS), the invention is not limited as such. Rather, the invention is applicable to any satellite-based system or pseudolite system. Therefore, "positioning system" is used throughout this application to refer to any satellite-based system or land-based system that transmits information from which a receiver's present location and/or the time of observation may be determined. This definition of a positioning system includes, for example, the NAVSTAR (Navigation Satellite Time and Ranging) Global Positioning System (GPS) that is maintained by the U.S. Department of Defense (DoD), the Global Orbiting Navigational System (GLONASS), TRANSIT, pseudolite systems and future systems like Geostar and NAVSAT.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
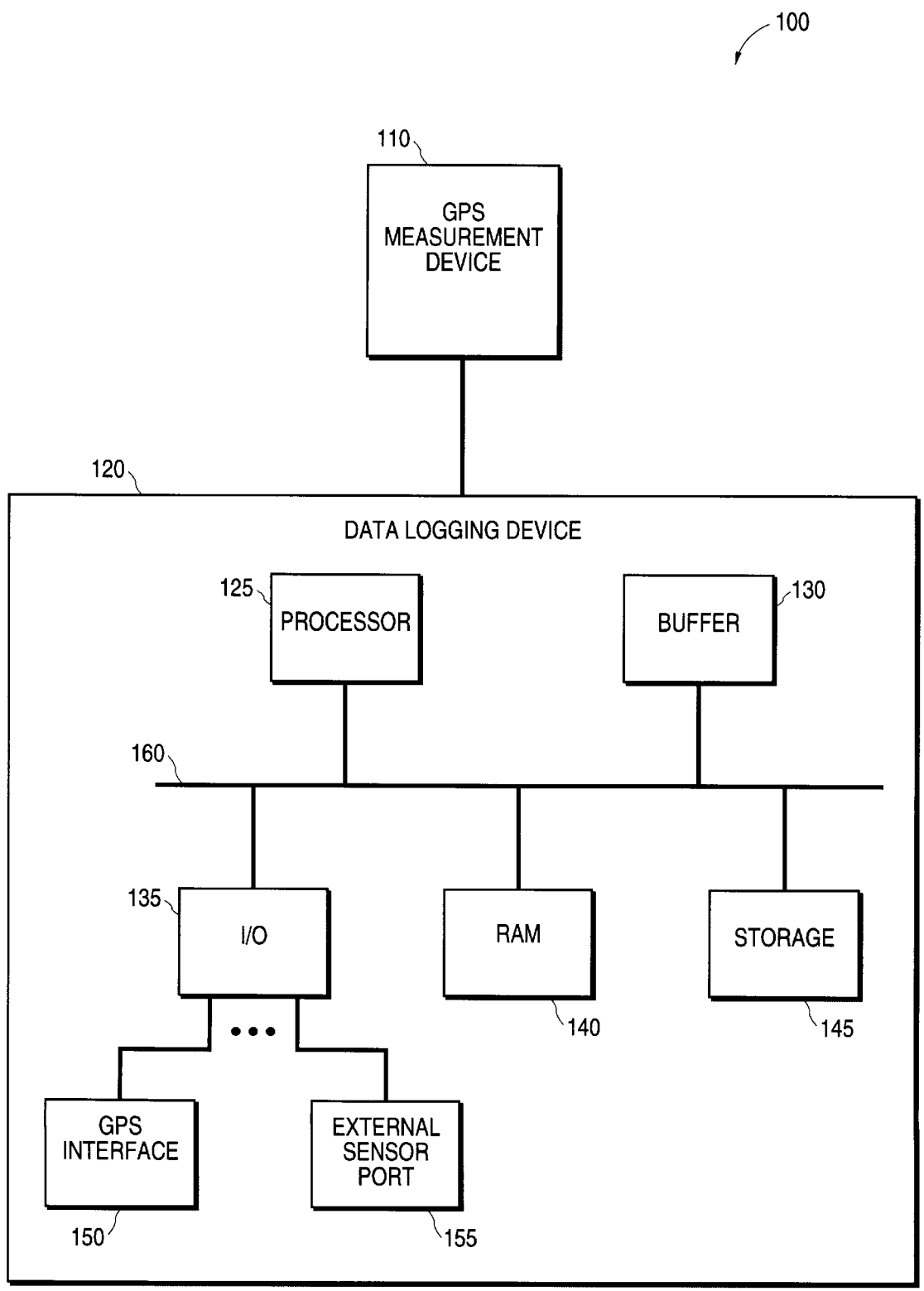
FIG. 1 is an exemplary positioning system receiver in which one embodiment of the present invention can be implemented.

Referring to FIG. 1, an exemplary positioning system receiver in which one embodiment of the present invention can be implemented is shown as 100. GPS receiver 100 includes a GPS measurement device 110 for receiving and processing information such as GPS data and further for detecting events with reference to the GPS data. The GPS receiver 100 also includes a data logging device 120 coupled to said GPS measurement device 110. While the GPS receiver in this example shows the GPS measurement device 110 and the data logging device 120 as separate devices, it is appreciated that the devices could be implemented in a single integrated system. Furthermore, it is apparent that the system can be implemented as more than two devices. In any event, the data logging device 120 comprises a bus or other communication means 160 for communicating information, and a processing means 125 coupled with bus 160 for processing information. Data logging device 120 further comprises a random access memory (RAM) or other dynamic storage device 140, coupled to bus 160 for storing information and instructions to be executed by processor 125. RAM 140 also may be used for storing temporary variables or other intermediate information during execution of instructions by processor 125. Data logging device 120 also includes a data storage device 145 for storing information. A variety of devices may be used to implement storage 145 such as removable hard disk drives, industry standard "PCMCIA" type plug-in modules, or solid state memory.

The data logging device 120 also includes a temporary data buffer 130. Buffer 130 is a random access memory or other dynamic storage device and may be constructed of multiple devices. Buffer 130 is for temporary storage of information such as GPS data until a decision is made as to whether or not all or part of the temporary data will be permanently stored in storage 145, for example. Note that it is not necessary for the buffer 130 or the storage 145 to actually be within the positioning system receiver. As explained further below, it may be preferable to locate one or both of the buffer 130 and the storage 145 in a device external to the positioning system receiver. As will be described in further detail below, use of the temporary buffer 130 allows different logging rates to be achieved. While, in this embodiment, buffer 130 is shown as separate from RAM 140, buffer 130 need not be a separate memory. For example, buffer 130 could be maintained within a portion of RAM 140.

The data logging device 120 further includes an Input/Output (I/O) device 135 coupled to bus 160 for managing I/O to/from the data logging device 120. One such input is data from the GPS measurement device 110 which is managed by a GPS interface 150. Another input is signals received from an external sensor port 155. External sensor port 155 may be coupled to an external device (not shown) for detecting external events. While prior mapping systems have provided the ability to connect to external sensors for recording sensor data directly with GPS position or time data, the receiver 100 of the present invention allows data logging processing changes to be triggered upon the occurrence of an external event which may be signaled by an external sensor, for example. Advantageously, this feature in conjunction with buffer 130 allows post processed survey systems to use different logging rates. In a real-time processing environment, this feature further allows automatic reversion to post-process recording from real-time processing when real-time solutions are not available. It will be appreciated that a variety of other I/O devices might be coupled to I/O 135. For example, a data port may be provided to output the contents of storage 145. Further, a serial I/O port may be provided to communicate GPS data to an external device such as a hand held storage unit which includes an off unit storage device and/or an off unit temporary buffer.

The present invention is related to the use of receiver 100 for automatic event detection and processing. In one embodiment, the processor 125 may execute a program that logs GPS data received from GPS measurement device 110. In this embodiment, the processor 125 logs the GPS data at a rate at least as high as a maximum desired rate to the temporary data buffer 130. When a predetermined event is detected, a subset of the GPS data, that has previously been logged to the temporary data buffer 130, may be transferred from the temporary data buffer 130 to storage 145 thereby providing a window of data around the predetermined event at the desired logging rate. In another embodiment, GPS data may be logged to the temporary data buffer 130 at a rate at least as high as the maximum desired rate and to the storage 145 at a default rate. As above, when a predetermined event is detected, the data received at the higher rate and temporarily stored in the temporary data buffer 130 may be transferred to the storage 145.

Advantageously, the present invention provides automatic handling of events. Therefore, no intervention is required by the user upon the occurrence of an external event. Another advantage of the present invention is a method is provided that allows different logging rates in a post processed survey system environment which may or may not be coupled to an RTK system. From a data management point of view, different logging rates provides an overall simplification of the survey system. For example, it allows the receiver to generate relatively small files for post processing. Therefore, the cost of the receiver is kept low because the amount of permanent storage required for storage 145 is reduced.

Figure 2:
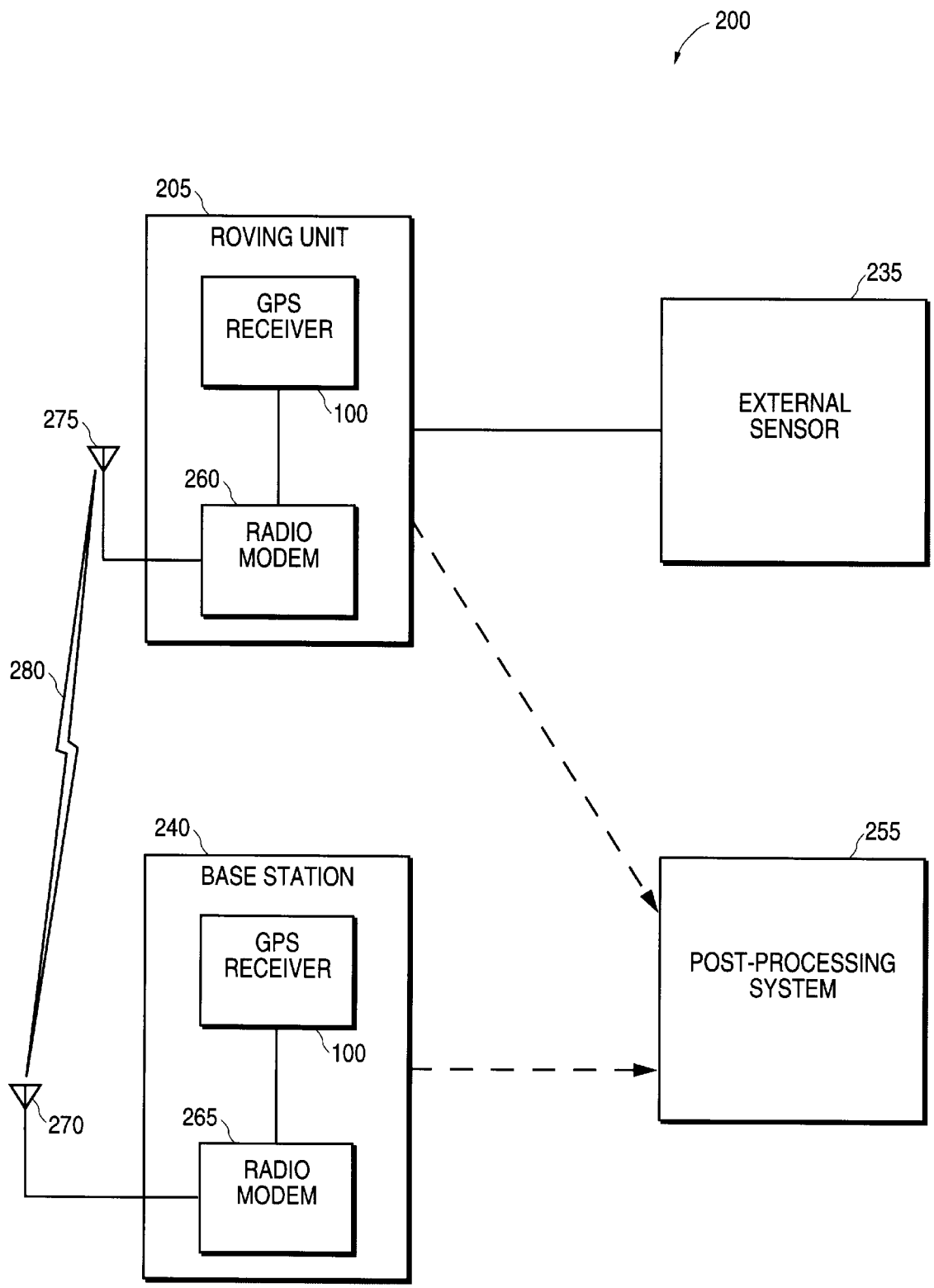
FIG. 2 is an exemplary survey system in which one embodiment of the present invention can be implemented.

Referring now to FIG. 2, an exemplary survey system in which one embodiment of the present invention can be implemented is shown as 200. Survey system 200 includes a roving unit 205, an external sensor 235, a base station 240, and a post-processing system 255.

Roving unit 205 also called a "survey rover" or "rover station" includes a GPS receiver 100, a radio modem 260, and a radio antenna 275. As described above, the external sensor 235 is coupled to GPS receiver 100 via external sensor port 155 to communicate the occurrence of an external event.

The base station 240 also called a "base reference station" or "primary reference station" includes a GPS receiver 100, a radio modem 265, and a radio antenna 270. When performing real-time surveying using relative positioning from the base station 240, a radio data link 280 may be maintained between radio modem 260 and radio modem 265 via radio antennas 270 and 275 for communicating GPS observables, for example.

In one embodiment, the base station 240 is part of a post processed survey system. In this embodiment, the base station 240 records data that is combined with data recorded by the roving unit 205 by a system such as post-processing system 255 which is typically located back at a shop or surveyor's office. Post-processing system 255 combines the data logged to storage 145 of the roving unit 205 and storage 145 of the base station to compute centimeter-level positions of the rover 205 at particular times. As will be discussed further with respect to FIGS. 6 through 8, the post-processing system 255 may also be used to recover survey position solutions for periods that the roving unit's GPS receiver 100 was not initialized. For example, due to setting and rising satellites, the roving unit's 205 GPS receiver 100 may lose initialization due to extended loss of contact with the base station 240. When loss of the radio link 280 is detected, the GPS receiver 100 may store previous initialization information and begin to record raw measurements for later initialization of post-processing system 255.

It should be noted that any or all of the components of the survey system illustrated in FIG. 2 and associated hardware may be used in various embodiments of the present invention; however, it will be appreciated by those of ordinary skill in the art that any configuration of the system may be used for various purposes according to the particular implementation.

Figure 3:
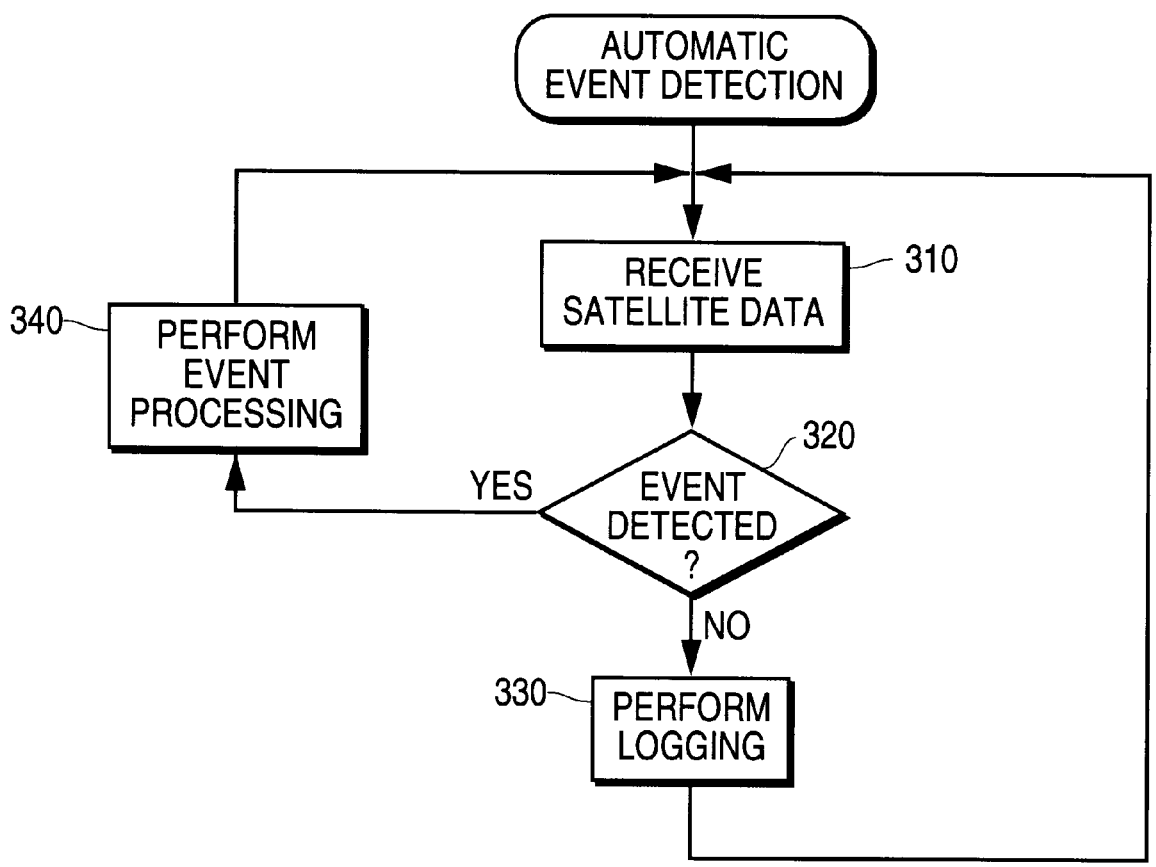
FIG. 3 is a high level flow diagram illustrating a method of automatic event detection according to one embodiment of the present invention.

FIG. 3 is a high level flow diagram illustrating a method of automatic event detection according to one embodiment of the present invention. At step 310, position data such as satellite data is received. Importantly, the terms "position data" and "satellite data" may include information such as GPS observables and corrections transmitted by the base station 240, and raw measurement data such as range, phase, cycle counts, and time information transmitted by a positioning system as well as position information calculated therefrom.

At step 320, a determination is made whether or not a predetermined event has occurred. If an event has been detected, the processing branches to step 340. Otherwise, processing continues to step 330. Events may include occurrences such as a change in tilt or roll which may be detected internally by the receiver or by an external device. Such events may be detected externally with the use of an external sensor such as an inclinometer and subsequently communicated to the processor 125 via the external sensor port 155. There are many types of sensors and other devices that may be coupled to the external sensor port 155 for a wide variety of applications. Exemplary devices that may be coupled to the external sensor port include, but are not limited to the following: cameras, light sensors, Geiger counters, laser rangefinders, magnetometers, gas/atmosphere analyzers, water quality analyzers, depth sounders, fish finders, infrared thermometers, corrosion meters, sonar, and radar.

Importantly, an event is not limited to occurrences detected/produced by an external device. Rather, the event may be a condition recognized with reference to the GPS data itself such as a change in satellite visibility or some other condition recognized by the GPS measurement device 110 such as a change in radio link status. If this is the case, the data logging device 120 may be notified of the event via GPS interface 150.

At step 330, if an event was not detected at step 320, data logging is performed by the data logging device 120. As will be discuss further below, data logging involves recording data such as satellite data to permanent storage such as storage 145, or to temporary storage such as buffer 130. In one embodiment, the data logging may be configured with data logging parameters. Data logging parameters may be predetermined default values or manually entered by the receiver operator. These parameters might include a set of standard logging parameters representing the data logging configuration such as the particular data to be recorded and/or the data logging frequency prior to detecting a predetermined event. Also, a set of logging parameters (e.g., modified logging parameters) may represent the data logging configuration subsequent to the predetermined event. For example, more or less data may be recorded, the data logging frequency may be increased or decreased, or data logging may begin upon the detection of a particular event. It may be desirable also to provide for input of event parameters which may include information such as whether or not the event requires data to be recorded to allow the post-processing system 255 to go backwards in time relative to the occurrence of the event or whether or not the event will be communicated via the external sensor port 155. If the event will be signaled over the external sensor port 155, the event parameters may additionally include characteristics of the external sensor and a name to be associated with the sensor record.

At step 340, appropriate event processing is performed in response to the detected event. For example, the event processing may be increasing the data logging rate for a period of time as discussed below.

Figure 4:
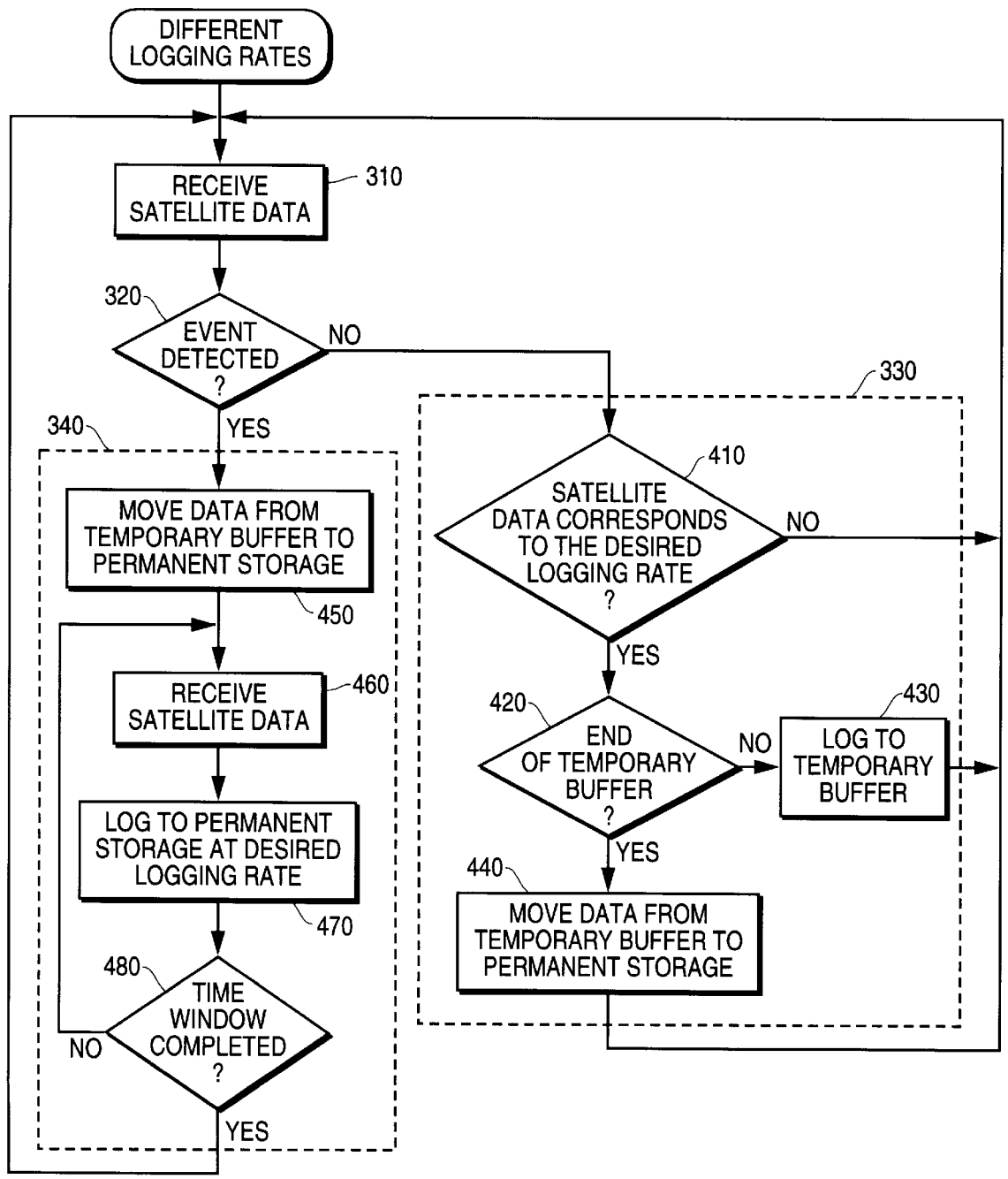
FIG. 4 is a flow diagram illustrating a method of achieving different logging rates in a post processed survey system according to one embodiment of the present invention.

FIG. 4 is a flow diagram illustrating a method of achieving different logging rates in a post processed survey system according to one embodiment of the present invention. Generally, a default, typically slow, logging rate is sufficient for the majority of the survey. However, often, a faster logging rate is desirable immediately preceding the occurrence of the predetermined event and immediately following the event. In this embodiment, regardless of the default logging rate, processor 125 records satellite data at the maximum desired logging rate to a temporary buffer such as buffer 130, thereby anticipating a data logging frequency change to this higher, desired logging rate. Advantageously, in this manner, one or more points will be available for subsequent interpolation that have been sampled prior to the event at the desired rate.

As indicated above, data logging may be configured with reference to one or more parameters such as a desired logging rate, a standard logging rate, a time window and event parameters. Again, the standard logging rate represents the initial frequency at which satellite data samples will be stored to permanent storage such as storage 145. In one embodiment, the desired logging rate represents the desired frequency of data logging for a time window in which the event lies. The time window indicates the duration of the recording at the desired frequency. At this point it should be mentioned that not all events require the ability to go backwards in time. For example, when a cycle slip occurs, the past information is not necessary. Therefore, it will be appreciated, in an alternative embodiment, the temporary buffer 130 is not required and the desired logging rate represents the desired frequency of data logging for a time period strictly after the occurrence of the event.

At any rate, for those events that do require the ability to go backwards in time, when data logging is complete, the event lies within time window. For example, if the time window is T seconds in duration, the resulting recording may contain data samples at the desired logging rate for 0.5T prior to the event and for 0.5T after the event or any ratio that is applicable for the particular application. This window of samples at a different logging rate is accomplished by employing a temporary data buffer. The temporary buffer is used to store data for a temporary period of time while it is determined whether or not all or part of the data should be transferred to permanent storage. If the data in the temporary buffer is not to be permanently stored, it may be overwritten or discarded. Many implementations are available for the temporary buffer such as a separate memory or a data structure in RAM such as a circular queue.

Steps 310 and 320 are the same as described with reference to FIG. 3. If an event has been detected, processing branches to step 340. Otherwise, processing continues with step 330.

In this embodiment, step 330 further includes steps 410 through 440. At step 410, a determination is made as to whether or not the time has come to record the satellite data to the temporary buffer based upon the desired logging rate. If the current time falls upon a time corresponding to the desired logging rate, at step 420, it is determined whether the end of the end of the temporary buffer has been reached. If space in the temporary buffer has not been exhausted, at step 430, the satellite data is logged to the temporary buffer. However, if the end of the temporary buffer has been reached, prior to overwriting any data, all or some of the data may be extracted from the temporary buffer and stored. At step 440, data representative of the standard logging rate is moved from the temporary buffer to permanent storage. For example, if the desired logging rate is 10 Hz and the standard logging rate is 1 Hz, when the temporary buffer has become full and the event has not been detected, then one of every ten samples from the temporary buffer is stored in permanent storage. This may be achieved, for example, by extracting one of every ten samples from the temporary buffer or by selecting one of every ten samples out of the data read from the temporary buffer. In any event, the temporary buffer must be able to accommodate a relatively high rate of data logging for a reasonable window of time. For example, assuming a 2 second window of samples at 10 Hz is desired prior to the event, storage space for up to 2,000 records may be required (further assuming as many as 10 satellites may be in view).

Prior to storing the samples to permanent storage as described above, it may also be desirable to retain certain state information contained within the data such as the occurrence or non-occurrence of a cycle slip. In the example above, to preserve this state information, the state information contained within each of the ten samples would be examined. Then, the sample to be permanently stored would be modified accordingly prior to its storage to reflect any important state information requiring preservation. Further, in certain situations it may be desirable to statistically combine the samples recorded at the desired logging rate to produce one sample representative of the time period rather than selecting the one sample corresponding to the standard logging rate as described above.

Upon the completion of either step 430 or 440 processing continues with step 310. Returning to step 410, if the satellite data does not correspond to the desired logging rate, then no logging is performed and processing continues with step 310.

In this embodiment, step 340 further includes steps 450 through 480. At step 450, temporarily stored satellite data samples are moved from the temporary buffer to permanent storage. In this manner, satellite data sampled prior to the event at the desired frequency is made available for later post processing.

After the event has been detected, subsequent satellite data received (step 460) is logged to permanent storage at the desired logging rate (step 470) until the time window is complete (step 480).

Figure 5:
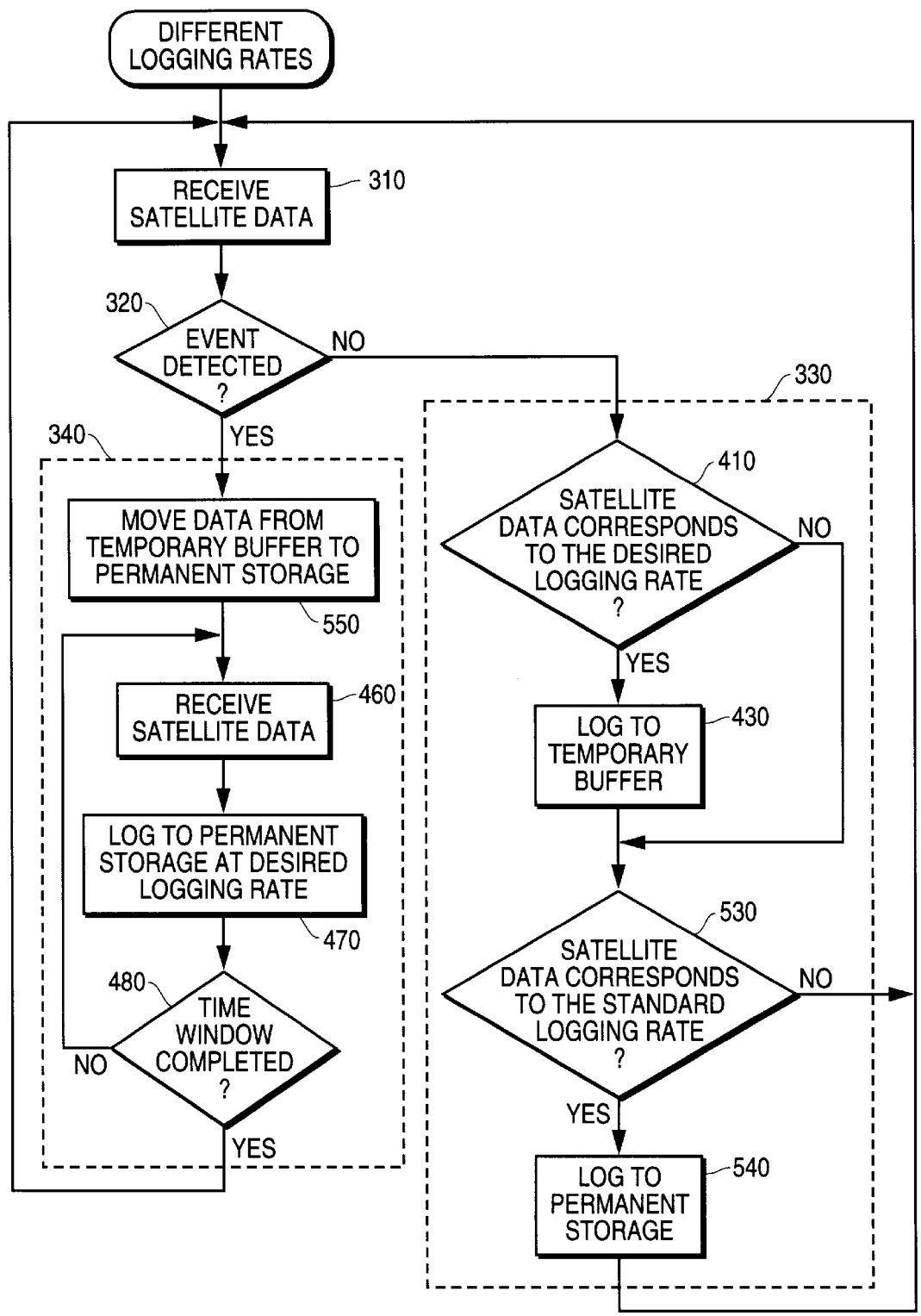
FIG. 5 is a flow diagram illustrating a method of achieving different logging rates in a post processed survey system according to another embodiment of the present invention.

FIG. 5 is a flow diagram illustrating an alternative method of achieving different logging rates in a post processed survey system. According to this embodiment, processor 125 constantly records satellite data to both a temporary buffer and to a permanent storage area. Satellite data is logged to the permanent storage area at a default logging rate and to the temporary buffer at a higher, desired logging rate, thereby anticipating a data logging frequency change to the higher logging rate. As in the embodiment described above, in this manner, one or more points will be available for subsequent interpolation that have been sampled prior to the event at the desired rate.

Steps 310 and 320 are the same as described with reference to FIG. 3. If an event has been detected, processing branches to step 340. Otherwise, processing continues with step 330.

In this embodiment, step 330 further includes steps 410, 430, 530, and 540. Steps 410 and 430 are as described above with the exception that the "no" branch of step 410 leads to step 530. If the current time does not fall upon a time corresponding to the desired logging rate, step 430 is skipped and step 530 is evaluated.

At step 530, based upon the standard logging rate, a determination is made as to whether or not the time has come to record a sample of satellite data to permanent storage. If the current time falls upon a time corresponding to the standard logging rate, at step 540 the satellite data is logged to permanent storage such as storage 145. Otherwise, step 540 is skipped and processing continues at step 310.

In this embodiment, step 340 further includes step 550, and steps 460 through 480 which have been described above. At step 550, temporarily stored satellite data samples are moved from the temporary buffer to permanent storage. In this embodiment, because satellite data has been logged simultaneously to both permanent storage and to a temporary buffer, duplicate samples exist. The duplicate samples in permanent storage may be overwritten at this point, manually removed after completion of the survey, or discarded or ignored during post processing. Again, through the use of a temporary buffer, satellite data sampled prior to the event at the desired frequency is made available for later post processing.

In an alternative embodiment, the method of FIG. 4 or 5 may be used to compress an existing log file. The existing log file would contain, for example, data logged at the maximum desired frequency and a marker in the datastream indicating the detection of an event. The existing log file would be read by a program executing on a general purpose computer system, for example. The system would compress the existing log file by extracting samples of data representative of a standard logging rate, as described above with respect to FIG. 4. Upon encountering the event marker, the system would retain a window of samples at the desired rate. After the window, the system would continue to compress the datastream by retaining only samples corresponding to the standard logging rate. Advantageously, the resulting compressed file would contain samples at two different logging rates and would be a fraction of the size of the original log file.

Figure 6:
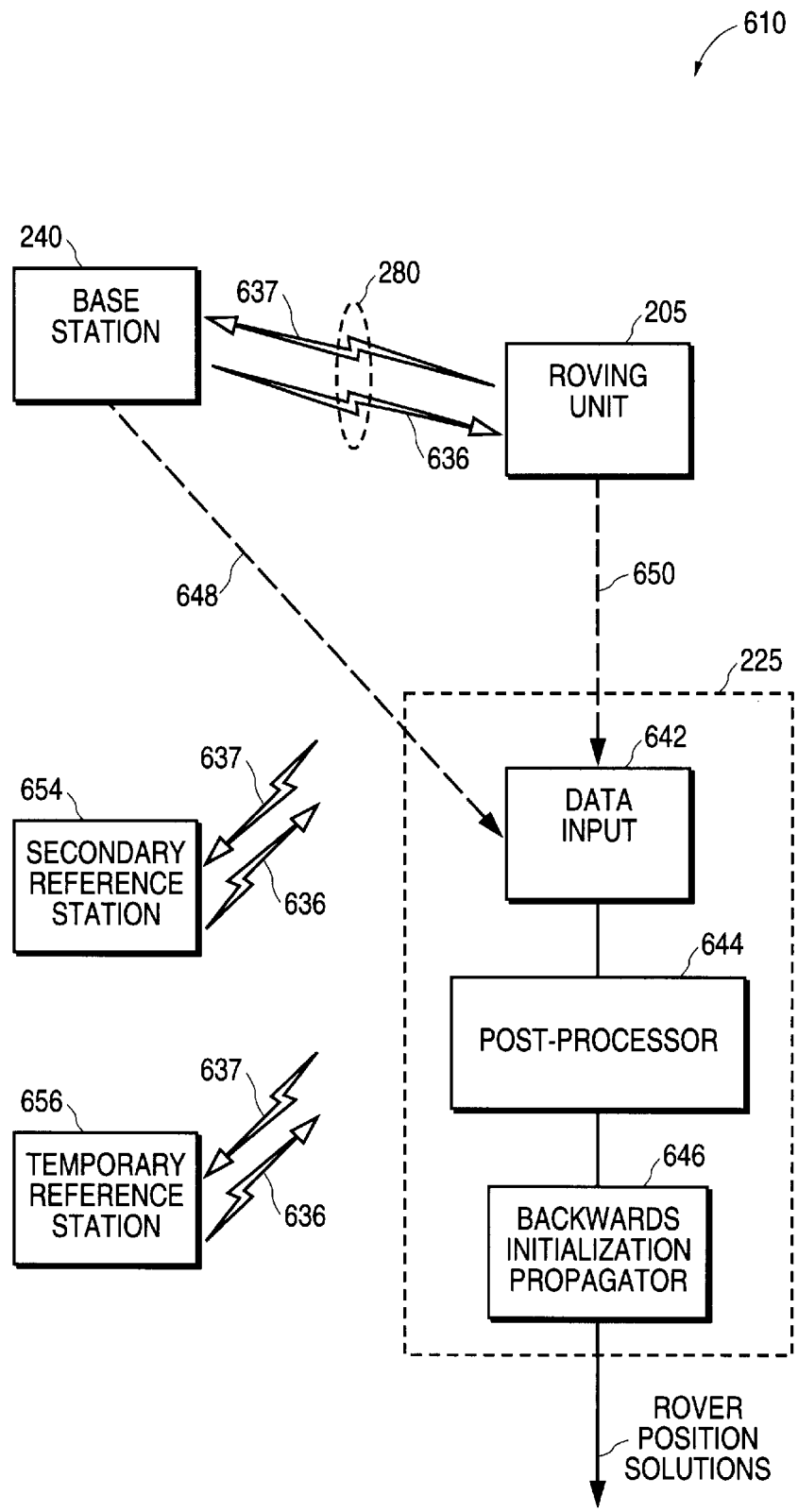
FIG. 6 is a block diagram of a survey system according to one embodiment of the present invention.

In a real-time kinematic (RTK) system, a method similar to that described with respect to FIG. 3 may be used to automatically revert to post process recording when real-time solutions are unavailable. For example, a position domain method for post-processor initialization, described further below, may be employed upon loss of the radio data link 280 from the base reference station 240. The rover 205 may record previous initialization information in a data file followed by its raw GPS measurements and satellite observables, and ending with any reestablished initialization information. Further, at step 330, position solutions and satellite measurements may be periodically stored in the temporary buffer for later time-tag alignment with other data. Alternatively, a measurement domain method, described further below, may be employed upon interruption of the radio link 280. In this embodiment, GPS data and integer ambiguities from the rover's position filter may be recorded. Later, a post processor may combine the recordings from the base reference station 240 and the rover 205 to recover survey position solutions for periods that the rover 205 was not in contact with the base reference station 240 over the radio link 280. Employing one of these two post-processor initialization methods, a survey system can provide real time processing at every opportunity and automatically and seamlessly reverts to post process recording when real time solutions are stumbling or prevented FIG. 6 is a block diagram of a survey system according to one embodiment of the present invention. The survey system 610 includes a real-time kinematic (RTK) base reference station 240. The RTK reference station 240 is preferably situated at a known location and its satellite measurements are sent to a survey rover 205 over the radio data link 280. The radio data link 280 may include a reference-to-rover radio data link 636 and a rover-to-reference radio data link 637. The radio data link 280 is established between the primary reference station 240 and the survey rover 205, e.g., on 900 MHz and using spread spectrum modulation. It may be advisable in particular applications to deliberately use different radio services and modulation methods for each of links 636 and 637 to make the overall communication system more robust.

Radio-modems such as TRIMTALK™ units by Trimble Navigation Limited of Sunnyvale, Calif. (hereinafter "Trimble"), may be used as repeaters to allow coverage of a large or obstructed area. Thus, line-of-sight is not required between the base 240 and rover 205.

As discussed earlier, the post-processing system 225 is conveniently located back at a shop or surveyor's office. In this embodiment, the post-processing system includes a data input 642, a post processor 644 and a backwards initialization propagation unit 646. A pair of recordings 648 and 650 are respectively communicated by wire or wireless means, or carried as data disks or tapes from the primary reference station 240 and the survey rover 205, to the post-processing system 255.

In alternative system embodiments of the present invention, a secondary reference station 654 and a temporary reference station 656 are included in system 610. Each are similar to the reference station 240 and may communicate with links 636 and 637. Additional information that may be helpful in constructing embodiments of the present invention may be found in U.S. patent application Ser. No. 08/367,051 filed Dec. 29, 1994. Such application is incorporated herein by reference.

Figure 7:
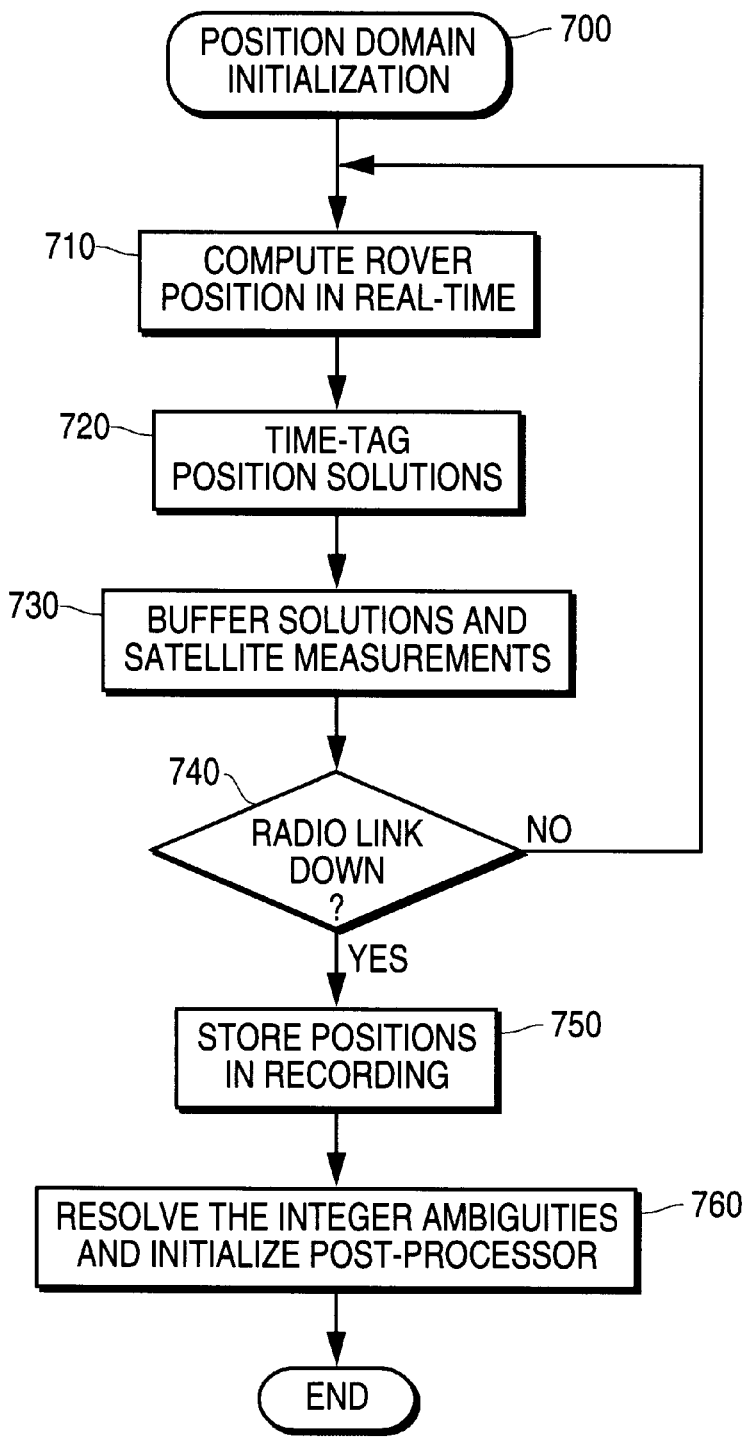
FIG. 7 is a flow diagram illustrating a position domain method used to initialize the post-processor of the survey system of FIG. 6 according to one embodiment of the present invention.

FIG. 7 is a flow diagram illustrating a position domain method 700 used to initialize the post-processor of the survey system of FIG. 6 according to one embodiment of the present invention. At step 710, the position of the rover 205 is computed in real-time. At step 720, each of the position solutions from step 710 are time-tagged using numbered GPS epoch periods, for example. At step 730, position solutions and associated GPS satellite measurements are buffered for later time-tag alignment with other data. At step 740, the status of the radio link 636 is checked. If the radio link 636 is broken, at step 750, the position solutions are stored in the recording 650. At step 760, the integer ambiguities are resolved using the rover position, which thus initializes the post-processor 644, e.g., similar to the conventional method of initializing a kinematic survey from a known baseline.

Figure 8:
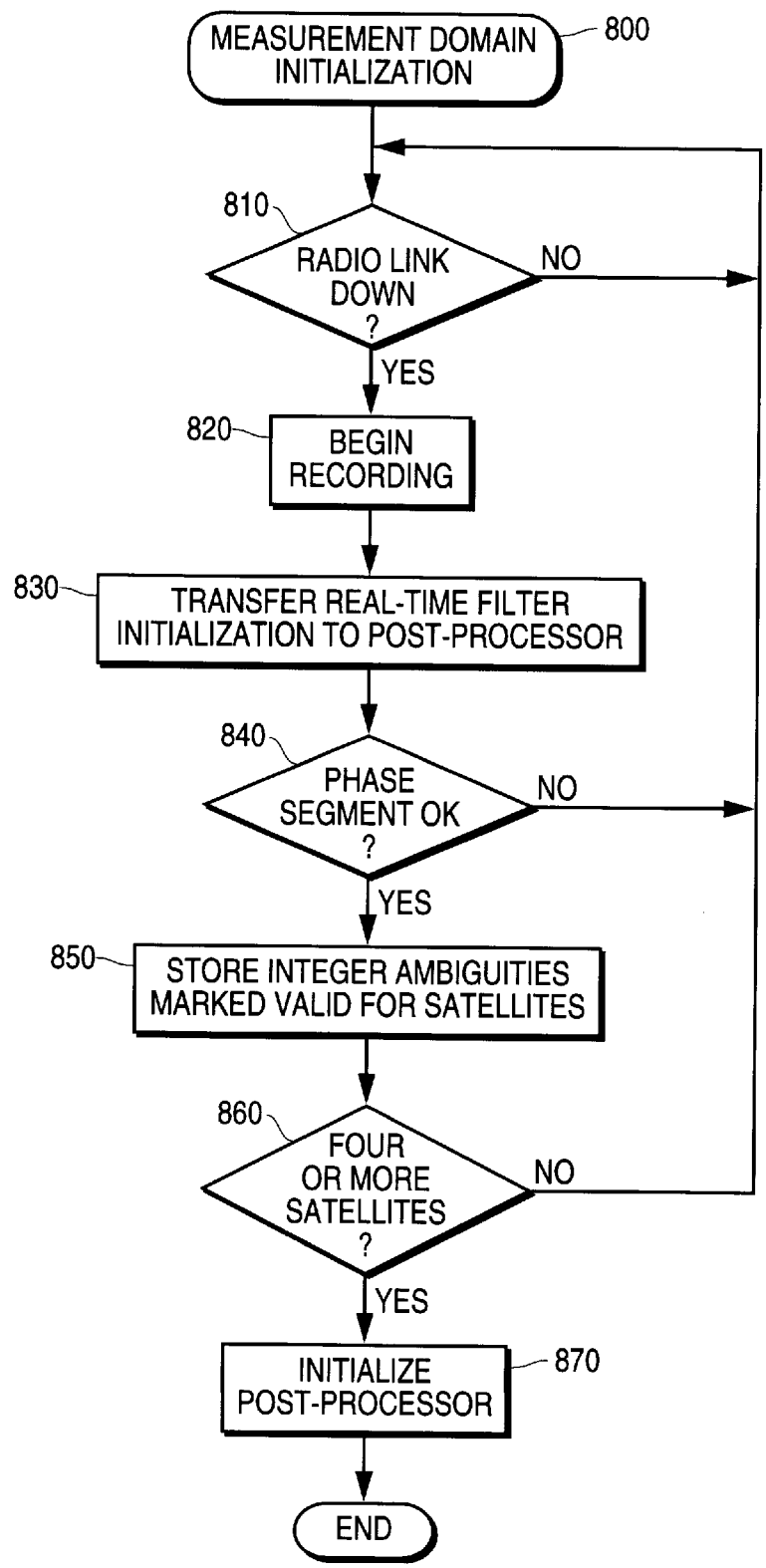
FIG. 8 is a flow diagram of a measurement domain method used to initialize the post-processor of the survey system of FIG. 6 according to one embodiment of the present invention.

FIG. 8 is a flow diagram of a measurement domain method 800 used to initialize the post-processor of the survey system of FIG. 6 according to one embodiment of the present invention. At step 810, a check is performed to determine if the radio link 636 has been interrupted. If the radio link 636 is not present, at step 820, the recording 650 is begun. Such recording preferably includes GPS data and the integer ambiguities from the position filter of the rover 205. Such will be used to directly initialize the position filter in the post-processor 644 in the post-processing system 255. The GPS data and the integer ambiguities are transferred to the post-processor 644 at step 830. At step 840, checks are performed to determine if the involved GPS satellites have been continuously tracked and that no cycle slips have occurred. If both checks are positive, at step 850 the GPS data and the integer ambiguities are stored in the post-processor 644 for each associated satellite. At step 860, checks are performed to determine if four or more satellites have been marked as providing valid data. If so, at step 870 the post-processor 644 is initialized directly starting with the position filter states which include the integer ambiguities and the covariance matrix supplied by the rover 205. Post-processed positions are thus made available from the post-processing system 255.

In the position domain method 700, the difference in carrier cycles between a GPS satellite and a reference GPS satellite at each of the primary reference station 240 and the survey rover 205 are computed. When each settles on the respective cycle counts, the GPS receiver 100 is said to be initialized and the rover 205 is capable of computing its position to the centimeter level by virtue of its initialization and the differential correction information provided by the primary reference station 240 over the radio data link 636. Centimeter level position solutions are prevented when the survey rover 205 loses its initialization or loses contact with the primary reference station 240.

The following gives details of the methods used to initialize the GPS receiver 100, which are employed prior to the methods used to transfer initialization to the post-processor 644, as depicted in FIGS. 7 and 8. Phase measurements are inherently ambiguous by an integer number of carrier wavelengths. Determining such integers in real-time, e.g., resolving the integer ambiguities, is fundamental to initializing RTK, and may be done in a variety of ways. Re-initialization is required whenever a continuous lock on four or more satellites is lost. Prior art single-frequency GPS surveying equipment requires occupation of a known survey mark or use of an initializer plate. Nevertheless, such L1-only systems provide most of the important productivity benefits of RTK, albeit while using less expensive receiver technology. When such inexpensive systems are used in open areas where the satellite visibility is good, the field productivity approaches that of the more costly dual-frequency technology.

Trimble's GPS TOTAL STATION™ and other similar commercial products support such static initialization methods. Trimble's GPS TOTAL STATION™ also supports fully automatic ambiguity resolution, which is effective when the rover is static or moving. Initialization while moving is called on-the-fly (OTF), e.g., RTK-OTF. In both static and moving initialization the methods are similar, and each relies on high quality dual-frequency observables from the GPS receivers 100. L1 and L2 pseudoranges and full-cycle L1 and L2 carrier phase measurements are made available. When there is an encryption of the precision code signal, the L2 pseudorange is simulated. Low power operation is essential for field operation, and commercially available integrated circuit technology may be employed, e.g., the MAX-WELL signal processing technology developed by Trimble.

Reliable and fast automatic initialization requires a minimum of five satellites, and can be thereafter maintained with four satellites. Conventional GPS post-processed survey methods include collecting information over time frames that are long enough to observe a significant change in satellite geometry, and therefore make do with fewer satellites.

The GPS measurement device 110 initializes in several steps. First, the integer ambiguities are estimated by forming float ambiguities from combined pseudorange and carrier phase. This enables a differential float-ambiguity solution. Then these estimates are filtered separately, or part of a position filter to reduce the effects of measurement noise. An integer search is next conducted to identify the correct set of integer ambiguities. The RTK solution is initialized and the differential fixed-ambiguity position solution is enabled. Lastly, the correct initialization is verified prior to storing survey quality positions.

When four satellites become visible, differential positioning may begin using a float-ambiguity solution. The accuracy of this is limited by the pseudorange noise which is dominated by local multipath. Sub-meter performance is typical and similar to differential positioning using RTCM differential beacon methods. Ambiguity resolution also may start, but an integer search will not be invoked until sufficient filtering occurs with four or more satellites visible at both the primary reference station 240 and the rover 205.

Following the integer search, the whole system 610 is preliminarily initialized and fixed-ambiguity centimeter-level positioning begins. Although the ambiguities are typically resolved with high confidence, a further integer verification step is usually necessary before allowing a survey to begin. This increases the probability of correct initialization to an acceptable level.

Once initialized, a subsequent loss of initialization and search is considerably enhanced when two or more satellites have been continuously tracked. One or two surviving double-differenced integers bridge over the loss of initialization. This then significantly reduces the number of potential integer combinations and speeds a final integer solution. Such a situation is more the norm than a complete loss of tracking of all the satellites.

Initialization integrity relates to the confidence with which the carrier integers are resolved. In other words, the confidence level that correct initialization was obtained. When L1 and L2 observables are combined, practically instantaneous initialization may be achieved. However, this is of little interest to the surveyor unless it is the usual case for the many varied field environments, e.g., multipath, tropospheric and ionospheric effects, poor satellite visibility, geometry, etc., and with a very high initialization success rate.

When static or at a survey mark, quality assurance indicators may optionally be recorded to ensure that the occupation time was sufficient to meet survey accuracy requirements selected by the surveyor. Covariance matrices are stored along with the positions for post-mission network adjustment. As a last line of defense, every position solution is associated with a unique initialization segment. Information pertaining to this segment may be stored within the measurement device 110, or wherever else convenient such as buffer 130, RAM 140, or storage 145.

An ambiguity search is at the heart of many RTK systems. The condition of the ambiguity search at any one point is very important to the overall operation of the post-processor 644. The number of fixed/float integer ambiguities is recorded for L1/L2, or any combination, e.g., "wide-lane" or "narrow-lane" bands. Information appears at the serial port each epoch period that is related to the current state of the ambiguity search and may be recorded for diagnostic purposes, e.g., the search list, the total number of candidates scanned to generate the search list, the search window used to generate the search candidates, the number of candidates in the search list, the RMS figure of the best ambiguity candidate, the RMS ratio of the best candidate to the next best candidate, the number of degrees of freedom accumulated in the search, and the number of satellites used in the search. The double difference float ambiguity estimates for each satellite combination are also important. The fixed integer ambiguity values may also be recorded for each double-difference satellite combination that has been successfully resolved. Error information, such as slippage faults, may be recorded to a file for the post processing system 255.

Recording 648 does not have to be continuous, it may be turned-on automatically, e.g., by request from the rover 205 over link 637 or automatically in response to a lack of status information from the rover 205.

Table I lists a sequence of event times that relate to the maintenance of the communication link 636.

TABLE I

| | |
|---|---|
| t0 | system 610 powered on |
| t1 | rover 205 initialized |
| t2 | last computed position time tag |
| (t2 + m) | satellites tracked drop below four |
| t3 | radio link 636 lost |
| t3 + 1 | link loss detected |
| t4 | radio link 636 reestablished |
| (t5 − n) | satellites tracked increase to four or more |
| t5 | rover 205 re-initialized |

Due to a latency in transmitting RTK measurement corrections from a reference station, it is usual for a time-tag of the computed real-time position to refer to a time one or two epochs prior to the current epoch time, the actual time when the real-time position is computed. For example, in a system with an epoch measurement interval of one second, at a time t, a real-time position is computed which refers to the position of the rover station at time t−1, e.g., the position time-tag is t−1 seconds.

When a radio link is interrupted at a time t, for example, the last computed position has a time tag of t−1. The most recent GPS data measured at the rover 205 has a time tag of t. It is necessary to start recording the GPS data for the post-processor 644 at time t, but a position with time-tag t is not available. Thus, a buffered scheme is desirable for initializing in the position domain.

A continuation of the recording 650 after any re-establishment of the data link 636 is provided for seamless post processing. At time t3, the time-tag of the GPS data given by the recording 650 is t3. However, the time-tag of the real-time position given by radio data link 636 is t3−x=t2, depending on the radio link latency x in time, for example t3−1. It is therefore preferable to store the GPS data beginning from time t2 and continuing thereafter. The roving unit's buffer 130 may be used to store data between times t2 and t3. The greater the link latency, the larger the value of x, in seconds, and thus the larger the difference t3−t2.

The buffer 130 may use the time-tags of both the real-time positions and the GPS data. A less common scenario can be described by the inclusion of events at times t2+m and t5−n. During the period between t2+m and t5−n, e.g., bounded by epochs when less than four satellites are being tracked, positions may still be computed by the post-processor 644, provided that post-processor 644 can be independently initialized. This requires periods between t2+m and t5−n with a minimum of four tracked satellites.

FIG. 7 illustrates an exemplary position domain method 700 for initialization of integer ambiguities. In this embodiment, at a time t0, the system 610 is first turned on. Raw measurement information and/or differential correction data begins to be communicated to the rover 205. At a time t1, the survey rover 205 has collected enough information to become initialized. Between time t0 and t1, prior to real-time initialization, the positions may be computed using post-processed data. Ordinarily, this period of productivity could be lost. By recording the information collected from the GPS satellite, the real-time survey position solutions may be reconstructed.

The recording 650 anticipates a loss of communication by constantly recording such data in a circular buffer such as buffer 130 that is transferred as a history to the recording 650 at time t3. Real time survey position solutions are not available after time t3 from rover 205, because data is not available from the reference 240. At a time t4, the radio data link 636 is reestablished. The recording 650 continues until a time t5 when the survey rover 205 initialization can be reestablished in real-time. A loss of radio link 636 does not cause the GPS measurement device 110 to become uninitialized, as long as four or more satellites are being continuously tracked. Information about the reestablished information is copied into the recording 650 at time t5 and the recording 650 is ended. Raw satellite measurement information, e.g., range, phase, cycle count and time measurements are recorded by the survey rover 205 in the recording 650 between times t2 and t5.

If, the rover GPS measurement device 110 loses initialization when the radio link 636 is down, the storing of new initialization information, e.g., the rover position at t5, allows backwards processing from t5 to a point t5−n, that is between t3 and t5 when post-processed initialization will be lost, e.g., a point when less than four satellites are tracked.

Should events t2+m and t5−n occur, post-processed positions using the initialization information provided by the GPS measurement device 110 can only be computed forwards between times t2 and t2+m, and backwards, between times t5 and t5−n. At time t2+m the number of continuously tracked satellites is less than four. At time t5−n the number of tracked satellites reaches four, and remains continuously at four or more until t5.

The initialization information recorded by the survey rover 205, with time t2 at the beginning of the file 650, is used by the post processing system 255 to compute centimeter level survey position solutions for the rover 205 between times t3 and t5.

Alternatively, initialization information recorded by the survey rover 205 at time t5 at the end of the file 650 may be backward propagated in time by the propagation unit 646 to be used by the post processor 644 to compute centimeter level survey position solutions for the rover 205 between times t3 and t5. Either way, such computations are, of course, not done in real time. The beginning and ending initialization information may also be cross compared to check the validity and improve solution confidence levels.

The systems described here may continue their logging with recordings 648 and 650 after system initialization, e.g., to increase the confidence level of the eventual transference.

The real time survey position solutions of the survey rover 205 that would otherwise have coverage gaps are seamlessly and automatically filled in by the brief, but focused, post-processing by the post-processing system 255.

The present invention does not require that the logging system be a part of the RTK base system. The logging system may be associated with any other part of the whole. Although one base station 240 associated with one rover unit 205 has been described here, the present invention includes the use of any number of base stations associated with any number of rover units.

The method 700 initializes the post-processor 644 using information in the position domain. The rover receiver position is computed in real-time and stored. The position is used to resolve the integer ambiguities within the post-processor 644. The process is similar to the conventional process of initializing a kinematic survey from a known baseline.

The position is a non-static variable, e.g., it changes at each measurement epoch. For this reason, when starting to store GPS data for post-processing, a position from the real-time processing must also be available for storage with a time-tag that corresponds with the first stored epoch of GPS data.

A circular buffer has been described in connection with the system 610. However, the use of buffers may complicate the software, which must maintain the buffers by allocating memory for the buffers, etc. Therefore, it may be desirable that something less complicated for the software be used instead. For example, a circular buffer may be used to store data between times t2 and t3, but such is not required between times t4 and t5, so conventional data storage may be used.

The measurement domain method 800 is preferred over the position domain method 700, since the quality of the position fix may be adversely affected by the prevailing satellite geometry, e.g., the position dilution of precision (PDOP). If the PDOP is very high, it may not be possible to reliably initialize the post-processor 644 using a position fix computed in real-time.

The measurements made by the GPS receivers 100 may themselves provide the integer ambiguities. The integer ambiguities are static variables, compared with the non-static nature of position. Once a satellite signal is acquired, the integer ambiguity remains constant until there is a cycle-slip or loss of signal lock.

Initializing with the measurement domain method 800 makes a circular buffer unnecessary. An overlap between real-time position fixes and stored GPS data is not required. Also, the initialization of the post-processor 644 is more reliable.

The measurement domain method 800 works independently of satellite geometry, and initialization computation is reduced. The integer ambiguities are simply transferred from the GPS measurement device 110 to the post-processor 644. The initialization of the post-processor 644 cannot fail if the GPS measurement device 110 was correctly initialized.

The collection of GPS data by recording 650 is not necessary in the method 800 between times t2 and t3. At time t3, the last position fix is computed in real-time prior to a radio link outage between t3 and t4. Such outages cannot be predicted in real systems, and the outage is not detected until time t3+1, assuming a one second epoch interval. At such time t3+1, no position fix is computed, and data recording 650 preferably is begun. The last computed position has a time-tag of t2 seconds, and cannot be used to initialize the post-processor 644 using the position domain method 700. At the first epoch of data recording 650, at time t3+1, the integer ambiguities from the GPS measurement device 110 are stored together with the GPS data to be used for the direct initialization of the post-processor 644.

It is critical that the integer ambiguities computed by the GPS measurement device 110 at time t3, but which have an identical time-tag as the position fix of t2, must still be valid at time t3+1 when they are stored. For each individual satellite, this will be true if the satellites involved are being tracked continuously between times t2 and t3+1. A continuous phase-segment counter is preferably used to guarantee this continuous tracking requirement for each satellite. Such counters are incremented each time a satellite has a cycle-slip or experiences a period of a loss of lock.

The integer ambiguities are associated with values of the segment counters. Prior to storing the integer ambiguities at time t3+1, the current segment counters for the GPS data collected at time t3+1 are compared against recorded segment-counter values that were associated with the integer ambiguities for the GPS data used by the GPS measurement device 110 at time t2. If the segment counters match, the integer ambiguity for the corresponding satellite is marked as valid for notice by the post-processor 644. However, the post-processor 644 must check that continuous tracking was maintained at the reference receiver 100 between times t2 and t3+1, e.g., by checking each of the cycle-slip flags stored in the recorded GPS data at the reference.

Integer ambiguities are, in reality, double-difference integer ambiguities that relate to ambiguities from two satellites. Thus, at least two satellites must be continuously tracked to provide one or more integer ambiguities. To initialize the post-processor 644, three or more integer ambiguities need to be generated, so four or more satellites must be tracked. In general, each satellite can be assumed to provide a corresponding integer ambiguity, insofar as double-differencing is concerned. So all the satellites provide an integer, with a reference satellite having an integer of zero that is a component in each double-difference.

The measurement domain method 800 resembles the position domain method 700 for the period in which the radio link 636 is unavailable and then is reestablished. GPS data is stored by recording 650 until time t5. At time t5, the GPS measurement device 110 in the rover 205 becomes initialized, and can produce a position with a time-tag of t5−x. Thus, GPS data stored with time-tags between t5−x and t5 are redundant, but this is of no consequence.

However, the position measurement method 700 assumes that the reference unit 240 continues to collect data throughout a survey. Epoch intervals of one second, or less, may be required for certain kinematic survey applications, e.g., continuous kinematic for contouring. Thus, the reference receiver 100 would require a large data storage memory capacity.

Alternative embodiments of the present invention make use of the radio link 637 from the rover 205 to the reference 240. When the radio link 636 from the primary reference station 240 to the rover 205 becomes unavailable, a message is preferably sent from the rover 205 to the primary reference station 240 to start GPS data recording. The radio link 637 is preferably of a different nature, e.g., one which is not affected by the same problem afflicting the link 636. In an alternative embodiment, an immediate response from the rover 205 is not required. Responses with the rover-to-reference communication link 637 may be reserved for when the reference-to-rover communication link 636 reestablishes.

The link 636 from the reference 240 to the rover 205 must have enough bandwidth to carry measurement corrections, whereas the link 637 back from the rover 205 to the primary reference station 240 may have a very narrow bandwidth. A single data recording switch in the GPS reference station receiver 100 is all that must be communicated. The radio link 637 may use a difference frequency, and even a different modulation scheme.

A further improvement may be made by allowing the rover 205 to communicate with the secondary reference receiver 654 which has the sole purpose of collecting GPS data for post-processing. A clear radio communication to this reference and knowledge of its position is required.

Another improvement may be made by having the temporary secondary reference receiver 656 communicate with the rover 205. When the radio link 636 is lost, a temporary survey mark is made at any convenient place, and the secondary reference receiver 656 is placed at this mark for GPS data collection.

Since the secondary reference receiver 656 may be local to the rover 205, data collection may be started manually without a communication link. The secondary reference receiver 656 must be established prior to a radio link 636 outage and position domain initialization 700 must be used. The position of the secondary reference receiver 656 may be initially unknown, in which case it must be established later and provided to the post-processor 644. Either real-time, for example, when the radio link 636 becomes available, or post-processed GPS survey methods may be used to obtain the secondary reference receiver 656 position.

The initialization of the post-processor 644 may be made using either a measurement domain method 800 or a position domain method 700. The latter must be used when employing a secondary reference. For the position domain method 700, the size of the circular buffer 130 must be sufficient to account for any addition latency caused by the communication channel between the rover 205 and reference station 240, to be able to start the GPS data recording at the primary reference station 240.

Referring to FIG. 8, the measurement domain method 800 begins data logging at the rover 205 at t3+1+Dt, where Dt accounts for the latency in starting the GPS data recording at the primary reference station 240 with a signal communicated over the rover-to-reference communication link 637. In this embodiment, the post-processor 644 must check for continuous satellite tracking between the times t2 and t3+1+Dt at the primary reference station 240. Data collection may be started by a command received from the user. The primary reference station 240 maintains a buffer for cycle-slip information between times t2 and t3+1+Dt, e.g., for the last x+1+Dt epochs. When GPS data recording is started at the primary reference station 240 at time t3+1+Dt, flags are set for each satellite which maintained continuous lock between these specified times. These flags are used by the post-processor 644 to validate the integer ambiguities stored at the rover 205.

When a secondary reference station 654 is used with the position domain initialization method 700, the post-processor 644 initializes to the receiver in the secondary reference station 654. It then resolves integer ambiguities which relate to the GPS data for the rover 205 and secondary reference station 654. The rover positions are then computed relative to this reference. The position of the receiver of the secondary reference station 654 is known relative to the primary reference station 240, so the rover 205 positions are also accurate relative to the primary reference station 240.

It may not always be possible when the radio link 636 from the primary reference station 240 to the rover 205 is broken for the rover 205 to be able to communicate back to the primary reference station 240 or with a secondary reference station 654. The return communication link 637 may be prevented or impossible.

Therefore, in one embodiment, each reference station 240, 654 or 656 preferably includes a GPS data buffer such as buffer 130 capable of storing data for T seconds, e.g., in a circular buffer. In this embodiment, every T seconds, the rover 205 communicates with the primary reference station 240, and sends a "link OK" message. This message indicates that during the last T seconds real-time positioning was possible without interruption and post-processing of GPS data is unnecessary.

When the radio link 636 is interrupted, the scheduled T-seconds report time will pass without such a link-OK message. The reference stations detect that a report has not been received. Accordingly, the reference stations save the contents of the data buffer and start the recording of GPS data. When the radio link 636 is reestablished, the rover 205 sends a message that instructs the reference stations to save the contents of the data buffer and to start GPS data recording. Of course, this message is redundant if the scheduled report time has already passed, because the reference stations would have already begun preparing for post-processing automatically. When real-time positioning restarts at the rover 205, either as soon as the radio link 636 is reestablished or after the GPS measurement device 110 has re-initialized, the rover 205 sends another message to the primary reference station 240 to stop GPS data recording. If the scheduled report time occurs prior to sending the stop-GPS-data-recording message, the usual link-OK message is not necessary.

The reference-rover communications preferably uses a hand-shaking protocol to ensure that the messages sent are actually received. The scheduled report times are easily synchronized at the reference 240 and the rover 205 since each have GPS time clocks available. The amount of data storage memory required at the primary reference station 240 is thereby reduced. Any additional data to be stored occurs only if the GPS measurement device 110 must be re-initialized.

The GPS data collection at the rover 205 is similar to that described for the primary reference station 240 that continuously stores data throughout a survey.

The position domain and measurement domain initialization methods for the post-processor 644 are also useful when the GPS data collection at the primary reference station 240 is not continuous.

The GPS data collected at the primary reference station 240 and rover 205 during periods of radio outage are typically post-processed at some later time by the post-processing system 255. The GPS data is downloaded to a processor, e.g., a personal computer (PC), over a local RS232 link, for example.

Alternatively, the GPS data stored at the primary reference station 240 may be broadcast to the rover 205, once the radio link 636 is reestablished, in conjunction with the data required for real-time positioning at the rover 205. Such data may be interleaved. At the rover 205, the GPS measurement device 110 processes both the real-time data and back-processes the data stored during the radio link 636 outage. The advantage of this method is that all the rover 205 positions are computed and available in the field without the need for downloading GPS data from the receivers 100 and post-processing in the office environment. Computing positions in the field helps to identify problems that might have occurred during post-processing and enables a surveyor to reoccupy survey points. For example, when less than four satellites are being tracked continuously at either reference or rover during the radio link 636 outage.

In general, the post-processor 644 is initialized using information from the GPS measurement device 110. The position domain method 700 of initialization depends on non-static position information. The measurement domain method 800 depends on static integer ambiguity information. The post-processor 644 is started in an initialized state, e.g., where the integer ambiguities are directly resolved from the transferred information.

The GPS measurement device 110 may pass all the information from its position filter to the post-processor 644. Such position filters usually comprise a multi-state Kalman filter, and the position filter need not be initialized. Therefore, the integer ambiguities do not need to be known.

The post-processor 644 may use this raw information to start its position filter in the most statistically optimum fashion, and produce the best quality positions. If the GPS measurement device 110 is not initialized, such information may nevertheless reduce the time required for the post-processor 644 to initialize. The transferred information preferably includes the position filter states and state covariance matrix.

The initialization methods of the present invention are useful in many other non-RTK types of position computation, e.g., other double-differenced and non-differenced processing applications. For example, computing rover positions with correction information from the primary reference station receiver 100 that is transmitted in a conventional RTCM-104 format, e.g., differential GPS. The real-time or post-processors are not required to be initialized in the RTK sense where the integer ambiguities are known.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A positioning system receiver for use in a post processed survey environment, comprising:
   a position measurement device configured to receive and process signals from a positioning system; and
   a logging device coupled to the position measurement device for recording position measurement data received from the position measurement device, the logging device recording position measurement data at a current logging rate, the logging device configured to automatically modify the current logging rate in response to an occurrence of a predetermined event.

2. The positioning system receiver of claim 1, wherein the current logging rate is temporarily increased for a predetermined amount of time after the occurrence of the predetermined event.

3. The positioning system receiver of claim 1, wherein the current logging rate is increased for a predetermined amount of time preceding the occurrence of the predetermined event.

4. The positioning system receiver of claim 1, wherein the current logging rate is increased for a predetermined amount of time preceding and subsequent to the occurrence of the predetermined event.

5. The positioning system receiver of claim 1, wherein the current logging rate switches from a first data logging rate to a second data logging rate in response to the occurrence of the predetermined event, the logging device further including:
   a processor configured to record position measurement data;
   a permanent storage coupled to the processor, the permanent storage having stored therein positioning system measurement data recorded by the processor at the first data logging rate; and
   a temporary storage coupled to the processor, the temporary storage having stored therein positioning system measurement data recorded by the processor at the second data logging rate, wherein the processor is configured to selectively transfer a subset of the positioning system measurement data from the temporary storage to the permanent storage upon the occurrence of the predetermined event.

6. The positioning system receiver of claim 1, wherein the processor is further configured to selectively transfer a subset of the positioning system measurement data from the temporary storage to the permanent storage upon exhausting the temporary buffer.

7. A method of producing a data file containing positioning system data representing different data logging rates, the method comprising the steps of:
   receiving positioning system data;
   logging the positioning system data at a first data logging rate to a data file; and
   automatically changing the first data logging rate to a second data logging rate for a predetermined amount of time preceding and subsequent to an occurrence of a predetermined event.

8. The method of claim 7, wherein the step of automatically changing the first data logging rate to a second data logging rate further includes the steps of:
   storing the positioning system data to a temporary buffer at the second data logging rate; and
   transferring a subset of the positioning system data from the temporary buffer to the data file upon detecting the predetermined event.

9. The method of claim 8, wherein the method further includes the steps of:
   storing positioning system data to the data file at the second data logging rate for the predetermined amount of time following the predetermined event; and
   storing positioning system data to the data file at the first data logging rate after the predetermined amount of time following the predetermined event.

10. The method of claim 7, wherein the positioning system data is received from a second data file.

11. The method of claim 7, wherein the positioning system data is received from a satellite positioning system.

12. A data logging device for use with a positioning system receiver, the data logging device comprising:
   a processor;
   a storage coupled to the processor for storing data received from a positioning system; and
   a memory coupled to the processor, the memory having stored therein sequences of instructions which when executed by the processor, cause the processor to perform the steps of
   receiving the data,
   logging the data to a storage device at a first logging rate, and
   automatically switching to a second logging rate upon detecting a predetermined event.

13. The data logging device of claim 12, further including a temporary buffer coupled to the processor, wherein sequences of instructions further cause the processor to perform the step of logging the data to the temporary buffer at the second logging rate.

14. The data logging device of claim 13, wherein the second data logging rate is X times N samples per second, the first data logging rate is N samples per second, the sequences of instructions further cause the processor to perform the step of upon determining that space in the temporary buffer has become exhausted, transferring a portion of data from the temporary buffer to the storage device, the portion of data representative of the first data logging rate.

15. The data logging device of claim 14, wherein the sequences of instructions further cause the processor to perform the steps of:

logging the data to the storage device at the second data logging rate for a predetermined amount of time; and after logging for the predetermined amount of time, reverting back to logging to the storage device at the first data logging rate.

16. The data logging device of claim 13, wherein upon detecting the predetermined event the sequences of instructions further cause the processor to perform the step of transferring data from the temporary buffer to the storage device.

17. The data logging device of claim 12, wherein the step of logging the data to a storage device at a first logging rate further includes the steps of:

extracting a subset of data from the temporary buffer, the subset of data representative of data logged at a first logging rate; and storing the subset of data to the storage device.

18. A recording apparatus for use with a positioning system receiver, the apparatus comprising:

a processor;

a storage coupled to the processor for storing data received from a positioning system; and a memory coupled to the processor, the memory having stored therein sequences of instructions which when executed by the processor, cause the processor to perform the steps of receiving the data, logging a first subset of the data to a storage device if a predetermined event has not been detected; and logging a second subset of the data to the storage device if the predetermined event has been detected.

19. The recording apparatus of claim 18, wherein the first subset corresponds to data representative of a first logging rate, wherein the second subset corresponds to data representative of a second logging rate, and wherein the sequences of instructions further cause the processor to perform the step of automatically switching to the second logging upon detecting a predetermined event.

20. In a surveying system, a method of data logging, the method comprising the steps of:

receiving positioning system data;

recording a first subset of the positioning system data prior to a predetermined event being detected; and recording a second subset of the positioning system data if the predetermined event has been detected.

21. The method of claim 20, wherein the surveying system is a real-time kinematic (RTK) system including a base reference station and a roving unit, and the first subset of the positioning system data includes real-time roving unit position solutions, and the second subset of the positioning system data includes data used for post processing.

22. The method of claim 21, wherein the base reference station communicates information to the roving unit via a radio link, the radio link having a status, and the predetermined event is a change in the radio link status.

23. The method of claim 21, wherein the predetermined event is a loss of RTK initialization at the roving unit.

24. The method of claim 20, wherein the surveying system is a real-time kinematic (RTK) system including a base reference station and a roving unit, and the first subset of the positioning system data includes RTK initialization information, and the second subset of the positioning system data includes integer ambiguities.

25. The method of claim 20, wherein the surveying system is a real-time kinematic (RTK) system including a base reference station and a roving unit, and the first subset of the positioning system data includes RTK initialization information, and the second subset of the positioning system data includes raw measurement information.

26. The method of claim 20, wherein the survey system receives signals from a satellite positioning system, and the predetermined event is a change in visibility of one or more satellites.

* * * * *

UNITED STATES PATENT AND TRADEMARK OFFICE
CERTIFICATE OF CORRECTION

PATENT NO. : 5,916,300
DATED : June 29, 1999
INVENTOR(S) : Kirk et al.

It is certified that error appears in the above-identified patent and that said Letters Patent is hereby corrected as shown below:

Column 5,
Line 55 insert --RTK-- between "previous" and "initialization"

Signed and Sealed this

Second Day of October, 2001

Attest:

NICHOLAS P. GODICI
Attesting Officer
Acting Director of the United States Patent and Trademark Office